United States Statutory Invention Registration [19]

[11] Reg. Number: H88

Savioli et al.

[45] Published: Jul. 1, 1986

[54] AMMUNITION BOLT FOR A FIREARM, HAVING IMPROVED SHAPED LOCKING LUGS THEREON

[75] Inventors: Giulio V. Savioli, Andover, N.J.; Kevin T. Bauer, Warwick, N.Y.

[73] Assignee: The United States of America as represented by the Secretary of the Army, Washington, D.C.

[21] Appl. No.: 764,022

[22] Filed: Aug. 9, 1985

[51] Int. Cl.[4] ..... F41C 11/06

[52] U.S. Cl. ..... 42/16

*Primary Examiner*—Deborah L. Kyle
*Assistant Examiner*—Ted L. Parr
*Attorney, Agent, or Firm*—Anthony T. Lane, Harold H. Card, Jr., Michael C. Sachs

[57] ABSTRACT

A firearm bolt comprises a base having a plurality of outwardly radially extending lugs. Transition surfaces between adjacent lugs are each concavely curved toward the base so that each lug has a broad base area connecting the lug to the base.

5 Claims, 4 Drawing Figures

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

AMMUNITION BOLT FOR A FIREARM, HAVING IMPROVED SHAPED LOCKING LUGS THEREON

STATEMENT OF GOVERNMENT INTEREST

The invention described herein may be manufactured, used and licensed by or for the Government for Governmental purposes without the payment to us of any royalties thereon.

FIELD AND BACKGROUND OF THE INVENTION

The present invention relates in general to firearms and in particular to a new and useful bolt for such firearms which includes a plurality of locking lugs having an expanded base area.

Bolts are known for firearms which include a plurality of locking lugs that extend outwardly from a cylindrical base of the bolt. An axial bore extends through the bolt which is adapted to receive a firing pin that can be struck against a round of ammunition held by the bolt in a receiver of the firearm, for igniting the ammunition.

Conventional bolt locking lugs are square cut and have sidewalls which intersect an outer diameter of the bolt base, at substantially right angles. This point of intersection represents a stress concentration which may lead to bending or breakage of the lug under high stress conditions.

SUMMARY OF THE INVENTION

The present invention comprises a bolt for a firearm which includes a base with a plurality of radially outwardly extending lugs. Side surfaces of the lugs connect with each other between two adjacent lugs to form a smooth concave surface. This avoids the areas of stress combination and produces lugs having a broader and stronger base. The concave surfaces between lugs may be tangent to and out of maximum surface of the base at at least one location.

Accordingly an object of the present invention is to provide a firearm bolt which comprises a base having a maximum outer diameter and lying on an axis, and a plurality of mutually spaced locking lugs connected to the base and extending radially outwardly from the base, each locking lug having side surfaces which extend smoothly from one lug to the next, said side surfaces each being convexly curved toward the maximum diameter of the base.

Another object of the invention is to provide a firearm bolt which has more strongly constructed lugs.

A still further object of the invention is to provide a firearm bolt which is simple in design, rugged in construction and economical to manufacture.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
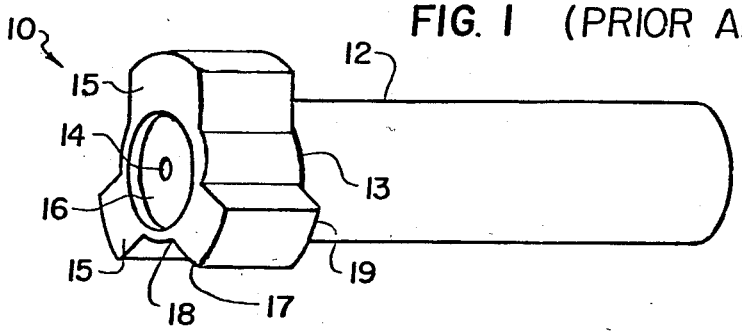
FIG. 1 (PRIOR ART)
FIG. 1 is a perspective view of a firearm bolt according to the prior art.
Figure 2:
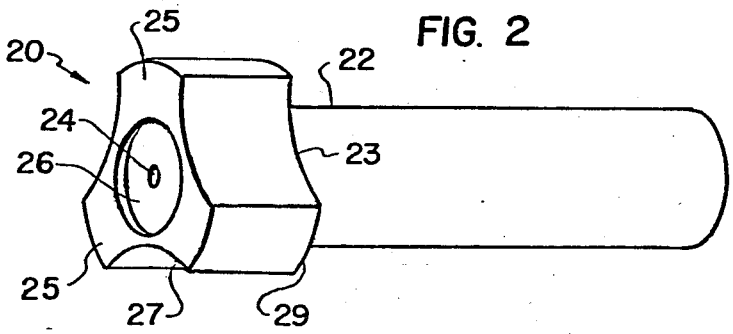
FIG. 2 is a perspective view of the inventive firearm bolt.
Figure 4:
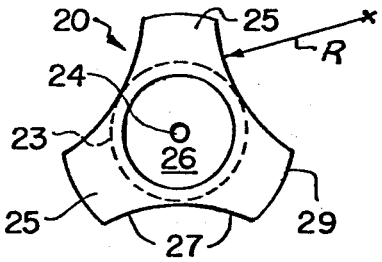
FIG. 4 is a front elevational view of the inventive bolt.

FIGS. 2 and 4 illustrate the inventive firearm bolt which is generally designated 20. Before describing the inventive bolt however the conventional bolt design shown in FIGS. 1 and 3 will be described.

Figure 3:
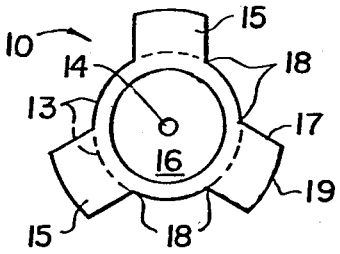
FIG. 3 (PRIOR ART)
FIG. 3 is a front elevational view of the bolt shown in FIG. 1.

In FIGS. 1 and 3, a conventional bolt generally designated 10 includes a base 12 which lies on a longitudinal axis of the bolt and which contains a through hole 14. Hole 14 is adapted to receive a firing pin (not shown) which, with the bolt 10 holding a cartridge in the receiver of the firearm (also not shown) can be struck by a hammer or the like to ignite the cartridge.

Base 12 of bolt 10 has a maximum outer diameter 13 which is generally near a front end of the bolt. A plurality, in this case three, lugs 15 are connected to the base 12 and extend radially outwardly from the base. Lugs 15 have an outer cylindrical surface 19 and sidewalls 17. The bolt base 12 also has an indented region 16 for embracing the tailend of a cartridge.

Lugs 15 form locking lugs which engage a suitably shaped portion of the firearm receiver. Base 12 rotates to lock locking lugs 15 in the receiver.

As shown in FIG. 3, the base area of each lug 15 which lies on a projection of the outer surface 13, and which connects the lugs to the base, are only as wide as the space between the sidewalls 17 of each lug. The sidewalls intersect the outer diameter 13 at stress concentration points 18. These represent relatively weak areas. If lugs 15 are overstressed these areas 18 may lead to the bending or breakage of the lugs 15.

As shown in FIGS. 2 and 4, the invention bolt 20 includes a base 22 having a maximum outer diameter 23. A plurality of lugs 25 extend radially outwardly from base 22. In the embodiment shown, three lugs are provided. Each of these lugs 25 has an outer cylindrical surface 29 and sidewalls 27. The sidewalls 27 of adjacent lugs run smoothly into each other and form a concave curved surface having a radius of curvature which is at least equal, and preferably larger than the radius of outer cylindrical surface 29. The radius of side surface 27 between adjacent lugs is shown at R in FIG. 4.

Each of the side surfaces 27 extends in such a way to tangentially touch the outer diameter 23 of the base 22, at at least one location.

By providing the smooth side surfaces as a transition between adjacent lugs, a far stronger lug structure is achieved. The lugs 25 of the invention have the same radial length as the squared off lugs 15 used in conventional bolts. By avoiding the abrupt transition areas 18, these points of stress concentration are eliminated.

A receiver to be used in conjunction with the inventive bolt must have an opening which corresponds to the shape of bolts 25 and their transition surfaces 27.

While a specific embodiment of the invention has been shown and described in detail to illustrate the application of the principles of the invention, it will be understood that the invention may be embodied otherwise without departing from such principles.

What is claimed is:

1. A firearm bolt comprising:

a cylindrical base having a maximum outer diameter and lying on a longitudinal axis; and a plurality of mutually spaced locking lugs connected to said base and extending radially outwardly from said base with respect to said longitudinal axis, each locking lug having sidewalls which extend smoothly from one locking lug to a next locking lug around said base, said side surfaces being concavely curved toward said base whereby each lug has a broad area of connection with said base.

2. A firearm bolt according to claim 1, wherein said plurality of locking lugs each have an outer curved surface lying on a common cylinder having a first radius, each side surface having a radius of curvature which is at least equal to said radius of said cylinder.

3. A firearm bolt according to claim 2 including three mutually spaced locking lugs connected to said base.

4. A firearm bolt according to claim 2, wherein said base is elongated along said longitudinal axis and includes a central bore therethrough.

5. A firearm bolt according to claim 4, wherein said base includes a recessed front end through which said bore extends.

* * * * *